(12) United States Patent
Young et al.

(10) Patent No.: US 6,223,848 B1
(45) Date of Patent: May 1, 2001

(54) AUXILIARY HYDRAULIC DRIVE FOR TRACTORS

(75) Inventors: David A. Young, Winnipeg; Harvey J. Chorney, West St. Paul; Vladimir M. Kowalyk, Winnipeg, all of (CA)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/377,362

(22) Filed: Aug. 19, 1999

Related U.S. Application Data
(60) Provisional application No. 60/097,463, filed on Aug. 21, 1998.

(51) Int. Cl.[7] .................................................. B60K 17/356
(52) U.S. Cl. ..................... 180/242; 180/305; 180/53.4; 180/53.6
(58) Field of Search ................................. 180/235, 242, 180/305, 307, 53.4, 53.6

(56) References Cited

U.S. PATENT DOCUMENTS

| | | | |
|---|---|---|---|
| 3,687,212 | * | 8/1972 | Forster ................................ 180/66 R |
| 4,019,598 | * | 4/1977 | Fresmann et al. ...................... 180/51 |
| 4,116,292 | * | 9/1978 | Todeschini et al. ................. 180/6.48 |
| 4,126,994 | * | 11/1978 | Rockwell ............................... 60/420 |
| 4,161,992 | * | 7/1979 | Abels et al. .......................... 180/306 |
| 4,271,723 | * | 6/1981 | Shaffer .................................. 74/720 |
| 4,356,878 | * | 11/1982 | Kestian et al. ........................ 180/235 |
| 4,402,181 | * | 9/1983 | Acker et al. ............................ 60/427 |
| 4,428,445 | * | 1/1984 | Zaunberger .......................... 180/6.44 |
| 4,505,168 | * | 3/1985 | Booth et al. ............................ 74/687 |
| 4,542,990 | * | 9/1985 | Fouquet ................................. 366/61 |
| 4,738,332 | * | 4/1988 | Wright ................................. 180/197 |
| 5,946,983 | * | 9/1999 | Brambilla ............................ 74/730.1 |
| 6,109,385 | * | 8/2000 | Deininger et al. ................... 180/306 |

* cited by examiner

*Primary Examiner*—J. J. Swann
*Assistant Examiner*—L. Lum
(74) *Attorney, Agent, or Firm*—Larry W. Miller; John William Stader; John B. Mitchell

(57) ABSTRACT

A splitter gearbox for a four wheel drive, hydrostatically driven tractor integrates both the input drive train and the output drive train into a single gearbox. The drive mechanism eliminates the need for a separate mechanical gearbox by establishing pre-set fixed displacement settings that are electronically controlled along with the variable displacement of the hydrostatic motor and hydrostatic pump, to provide a smooth power shift through all ranges without requiring the tractor to stop. The drive mechanism is configured so that essentially all components are individually controlled so that the entire power generated by the tractor engine can be diverted to any one of the traction drive, the PTO mechanism, the auxiliary hydraulic drive or, to a somewhat lesser extent, the tractor hydraulic system. The splitter gearbox is mounted to the rear axle housing to allow the sharing of a common oil sump. The input gear set and the output gear set are also within the same common lubrication sump within the splitter gearbox.

3 Claims, 7 Drawing Sheets

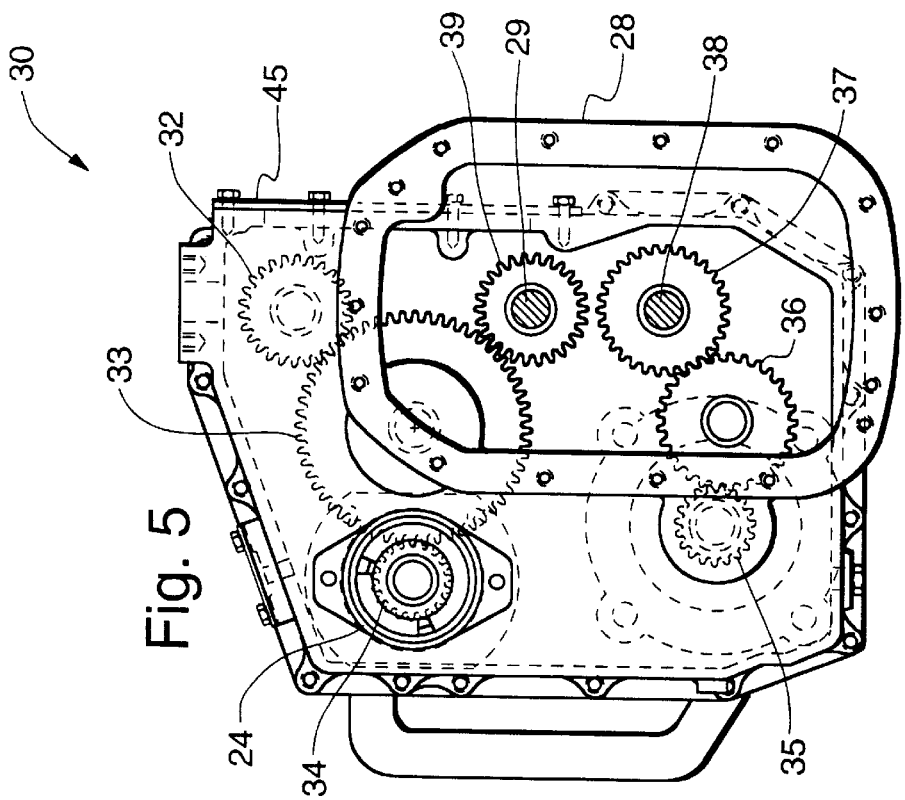
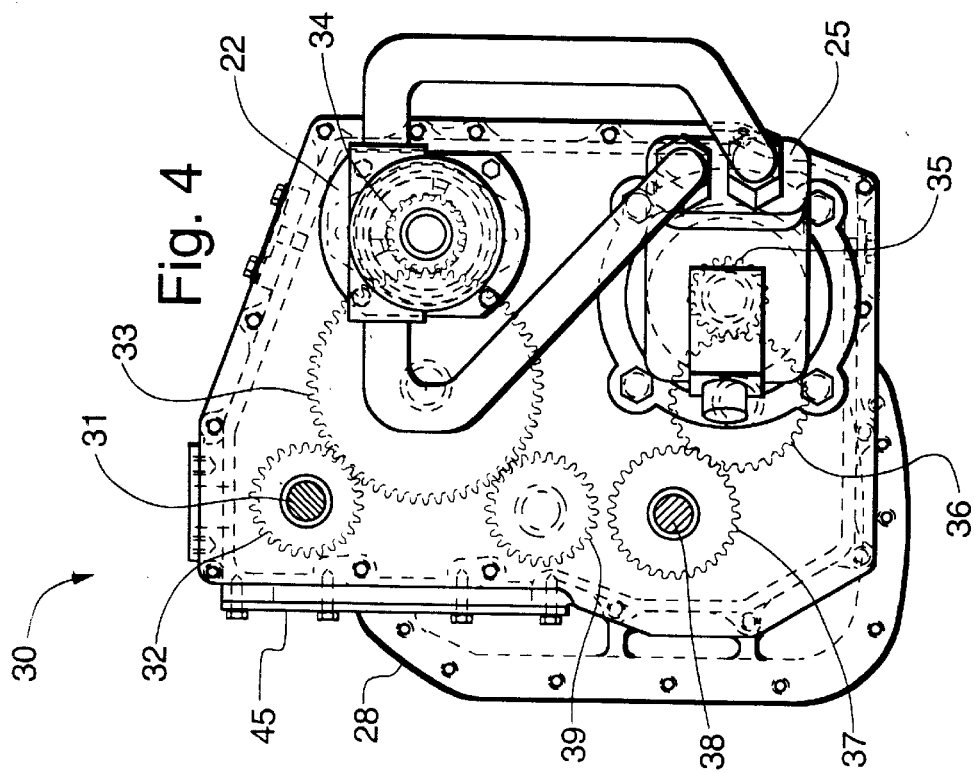

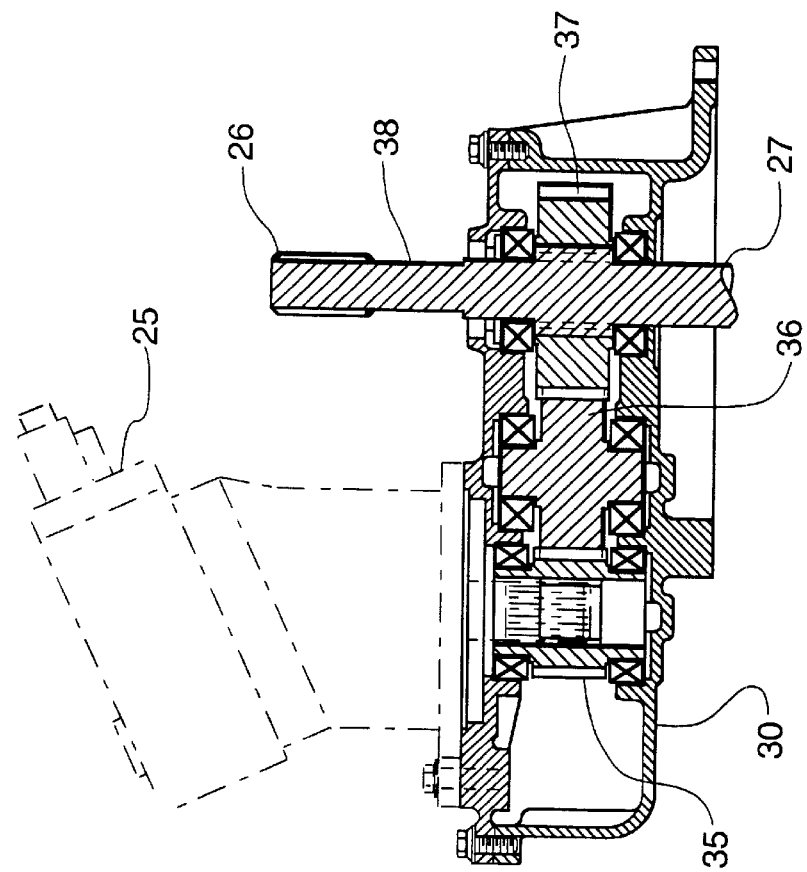
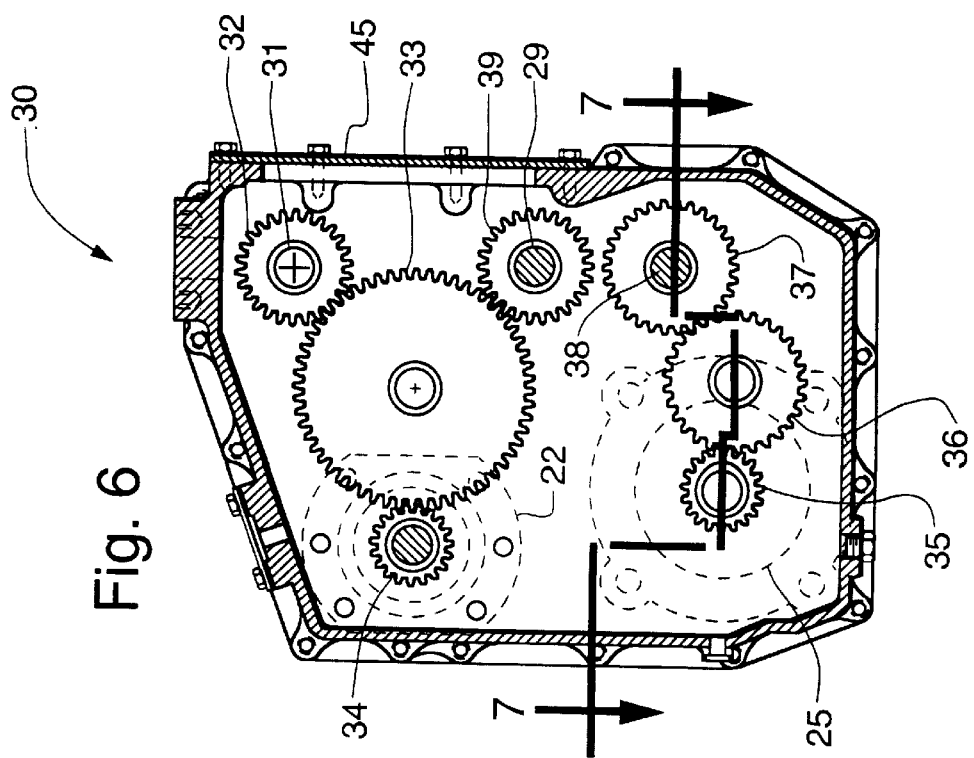

AUXILIARY HYDRAULIC DRIVE FOR TRACTORS

CROSS-REFERENCE TO RELATED APPLICATIONS

This application claims domestic priority on U.S. Provisional Patent application Serial No. 60/097,463, filed on Aug. 21, 1998.

BACKGROUND OF THE INVENTION

This invention relates generally to four wheel drive articulated tractors and, more particularly, to improvements to the drive system for hydrostatically driven tractors.

It is desirable to integrate all the drives for the input driven components of an articulated four wheel drive tractor into a single gearbox affixed to the rear axle housing of the tractor. Such a mechanism would place the hydrostatic pump for powering the traction drive of the tractor, the hydraulic pump for the tractor hydraulic system, the drive for the power-takeoff (PTO) system, and any auxiliary hydraulic pumps to be driven off the same gearbox device with the output driver components, including the hydrostatic motor, speed reduction gears and output drive shafts.

Lubrication of a gear set is a consideration is the design of a gearbox device for transferring rotational power through gear sets arranged and configured to provide the proper rotational speed to a component driven from the engine of the tractor. Commonizing lubrication sumps can minimize the number of lubrication systems that need to be provided as well as provide more effective lubrication of the gear sets and the cooling of the lubrication fluid.

Conventional tractor drive mechanisms include a mechanical transmission to provide different output speeds for a given engine input speed. Even hydraulically driven tractors have utilized a three speed mechanical transmission between the engine and the hydrostatic pump to provide desired different input speeds to the operation of the hydrostatic pump for powering the movement of the tractor. It would be desirable to replace the three speed mechanical transmission on hydrostatically driven tractors to minimize cost and to enhance operation of the tractor.

The gearbox would preferably be configured to mount the auxiliary pump drive mechanism in an optional manner so that the auxiliary pump could be added to the gearbox, if desired, and be driven therefrom.

SUMMARY OF THE INVENTION

It is an object of this invention to integrate the drive mechanisms for a hydrostatically driven, four wheel drive tractor in which all the drives are driven from a single splitter gearbox.

It is a feature of this invention that the splitter gearbox is affixed to the rear axle housing of the tractor.

It is an advantage of this invention that the mounting of the splitter gearbox to the rear axle housing allows the splitter gearbox and the rear axle housing to share a common oil sump.

It is another advantage of this invention that the mounting of the splitter gearbox to the rear axle housing reduces complexity.

It is another object of this invention to drive the front and rear axles of a four wheel drive tractor from a variable displacement hydrostatic motor.

It is another feature of this invention that a hydraulically driven tractor need not have a conventional transmission in order to obtain customary speed ranges desired for a tractor.

It is still another feature of this invention that the variable displacement hydrostatic motor can be provided with a selected number of pre-set swash plate positions to effectively replace a conventional transmission gearbox.

It is another advantage of this invention that the fixed positions of the variable displacement hydrostatic motor, coupled with a variable speed hydraulic pump, can be controlled electronically to provide a smooth power-shifting operation.

It is still another advantage of this invention that the tractor does not require stopping to shift gears in order to change the range of operation of the tractor.

It is another feature of this invention that the splitter gearbox incorporates a gear drive system in association with the hydrostatic motor to provide a shaft extending forwardly and rearwardly out of the splitter gearbox to drive, respectively, the front and rear axles of the tractor.

It is still another advantage of this invention that the front and rear axles of the four wheel drive tractor are driven from a single hydrostatic motor.

It is still another object of this invention that the input drive train and the output drive train are incorporated into a single splitter gearbox.

It is yet another object of this invention to provide an auxiliary pump drive for a four wheel drive tractor.

It is still another feature of this invention that the auxiliary pump drive can be mounted as an option to the side of the splitter gearbox.

It is yet another advantage of this invention that the auxiliary pump can be driven from an idler gear appropriately positioned within the splitter gearbox.

It is a further object of this invention to provide a splitter gearbox for a four wheel drive, hydrostatically driven tractor which is durable in construction, inexpensive of manufacture, carefree of maintenance, facile in assemblage, and simple and effective in use.

It is still a further object of this invention to provide an auxiliary drive mechanism that can be mounted on a splitter gearbox for a four wheel drive, hydrostatically driven tractor, which is durable in construction, inexpensive of manufacture, carefree of maintenance, facile in assemblage, and simple and effective in use.

These and other objects, features, and advantages are accomplished according to the instant invention by providing a splitter gearbox for a four wheel drive, hydrostatically driven tractor in which the input drive train and the output drive train are integrated into a single gearbox. The drive mechanism eliminates the need for a separate mechanical gearbox by establishing pre-set fixed displacement settings that are electronically controlled along with the variable displacement of the hydrostatic motor and hydrostatic pump, to provide a smooth power shift through all ranges without requiring the tractor to stop. The drive mechanism is configured so that essentially all components are individually controlled so that the entire power generated by the tractor engine can be diverted to any one of the traction drive, the PTO mechanism, the auxiliary hydraulic drive or, to a somewhat lesser extent, the tractor hydraulic system. The splitter gearbox is mounted to the rear axle housing to allow the sharing of a common oil sump. The input gear set and the output gear set are also within the same common lubrication sump within the splitter gearbox.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a front elevational view of the splitter gearbox and associated drives corresponding to lines 4—4 of FIG. 3;

FIG. 5 is a rear elevational view of the splitter gearbox corresponding to lines 5—5 of FIG. 3;

FIG. 6 is a cross-sectional view through the splitter gearbox taken along lines 6—6 of FIG. 3;

FIG. 7 is a cross-sectional view of the splitter gearbox taken along lines 7—7 of FIG. 6 to depict the gear drive system for driving the front and rear axles from a single hydrostatic motor shown in phantom;

DETAILED DESCRIPTION OF THE PREFERRED EMBODIMENT

Figure 1:
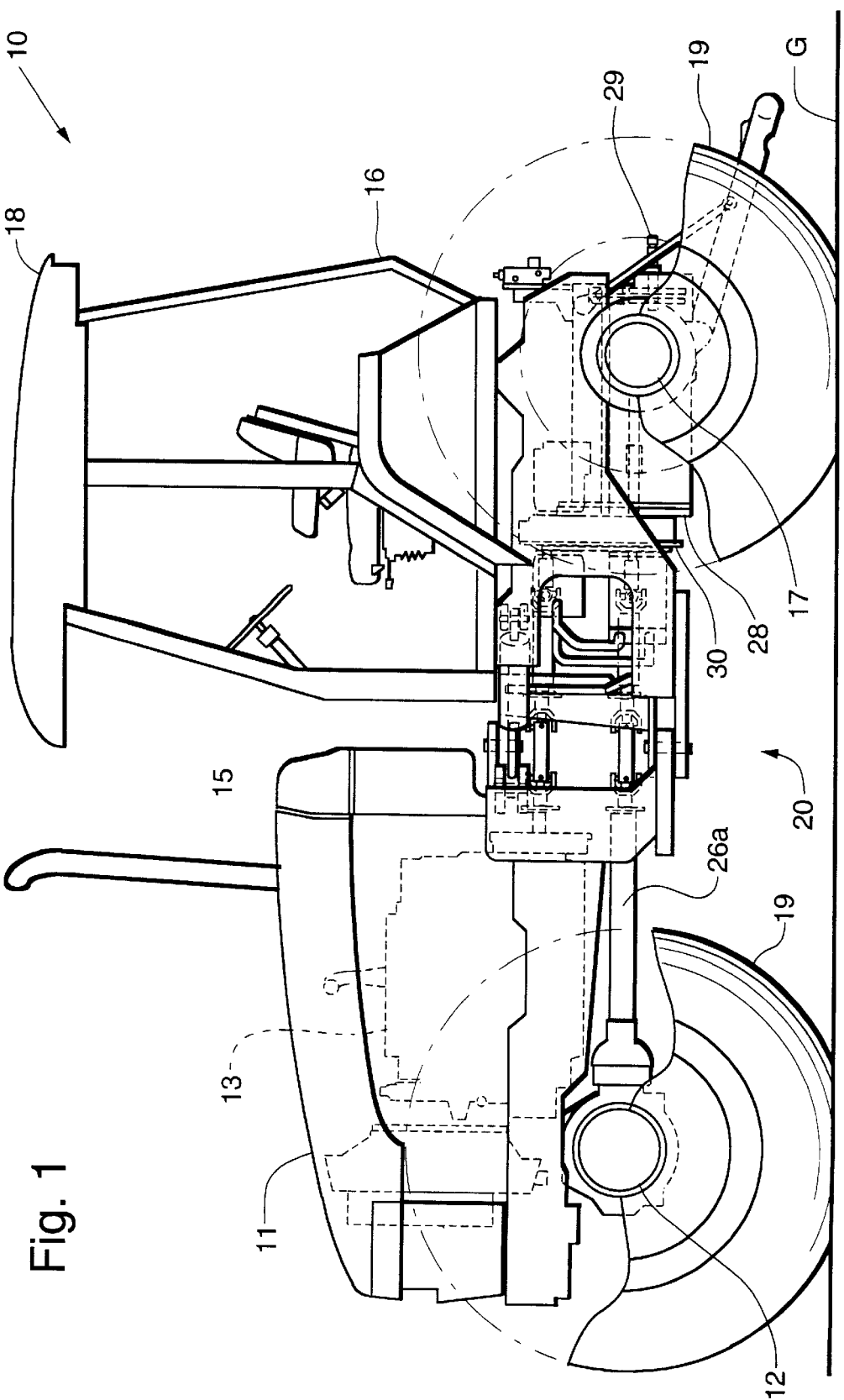
FIG. 1 is a side elevational view of a four wheel drive, articulated tractor incorporating the principles of the instant invention, portions of the tractor being broken away for purposes of clarity.

Referring now to FIG. 1, a four wheel drive, articulated tractor incorporating the principles of the instant invention can best be seen. The articulated tractor 10 includes a forward engine end 11 supported above the ground G by a front axle assembly 12 and carrying an engine 13. The rearward cab end 16 of the tractor 10 is supported above the ground by a rear axle assembly 17 and has an operator's station 18 mounted thereon. Each of the front and rear axle assemblies 12, 17 is provided with a pair of opposing wheels 19 for mobile movement of the tractor 10 over the surface of the ground G. The front and rear ends 11, 16 of the tractor 10 are connected by an articulation joint 15, the manipulation of which effects steering of the tractor 10 in a known manner.

As best seen in FIGS. 1–7, the tractor 10 is provided with a drive system 20 that is operatively connected to the engine 13 to provide operative power for the front and rear axle assemblies 12, 17. The drive system 20 includes a splitter gearbox 30 mounted on the front of the rear axle assembly 17 in a manner to share the oil sump therewith for lubrication purposes. The drive system 20 also includes the input drive components, including a hydrostatic pump 22 for powering the traction drive of the tractor 10, a hydraulic pump 24 for pressuring the hydraulic system of the tractor 10, and a power takeoff (PTO) mechanism 29; and the output drive components, including a variable displacement hydrostatic motor 25 to provide operative power to both the front and rear axle assemblies 12, 17 through front and rear output drive shafts 26, 27.

The splitter gearbox 30 receives rotational power from the engine 13 via a power input shaft 31 interconnecting the engine 13 and the splitter gearbox 30 to rotate the input gear 32. As best seen in FIGS. 4–6, the input gear 32 is drivingly engaged with a first idler drive gear 33, the size of the respective gears 32, 33 being selected to provide the appropriately desired gear reduction. The first idler drive gear 33 is drivingly engaged with a pump drive gear 34 having both the hydrostatic pump 22 and the hydraulic pump 24 coaxially mounted therewith, the hydrostatic pump 22 being mounted on the front of the splitter gearbox 30 and the hydraulic pump 24 being mounted on the rear of the splitter gearbox 30. The idler drive gear 33 is also drivingly engaged with the PTO drive gear 39 for powering the PTO mechanism 29 as a direct drive input from the engine 13.

As best seen in FIGS. 3–7, the hydrostatic pump 22 is operable to circulate hydraulic fluid under pressure to a variable displacement hydraulic motor 25 mounted on the front of the splitter gearbox 30 below the hydrostatic pump 22 to drive rotation of the hydraulic motor 25. The drive pinion 35 of the hydrostatic motor 25 is drivingly engaged with a second idler gear 36, which is also appropriately sized to provide the desired gear reduction. The second idler gear 36 is drivingly engaged with a traction driven gear 37 having a single shaft 38 extending therethrough to project both forwardly and rearwardly from the splitter gearbox 30 and form the front and rear output drive shafts 26, 27. Control of the hydrostatic pump is effected through a conventional mechanical linkage.

The hydrostatic motor 25 is preferably set-up with three pre-set, fixed swash plate angles to provide three positive displacements for the motor 25 to proximate a conventional operation of the tractor 10. By utilizing the variable displacement of the hydrostatic motor 25 and/or a variable speed hydrostatic pump 22, the infinite speed adjustment for the tractor 10 can still be attained on-the-go. Using an electronic control system to control the operation of the motor 25, such as by modulating the displacement of the motor 25, and to control the operation of the pump 22, a very smoothly operating power-shift tractor 10 will result without requiring the operator to stop the tractor to change gears in a mechanical transmission, as is conventional. The fixed, pre-set displacements for the hydrostatic motor 25 provide maximum torque and minimum speed at a first position, a mid-range of both torque and speed at a second position, and a minimum torque with maximum speed for roading operations at a third position.

Figure 2:
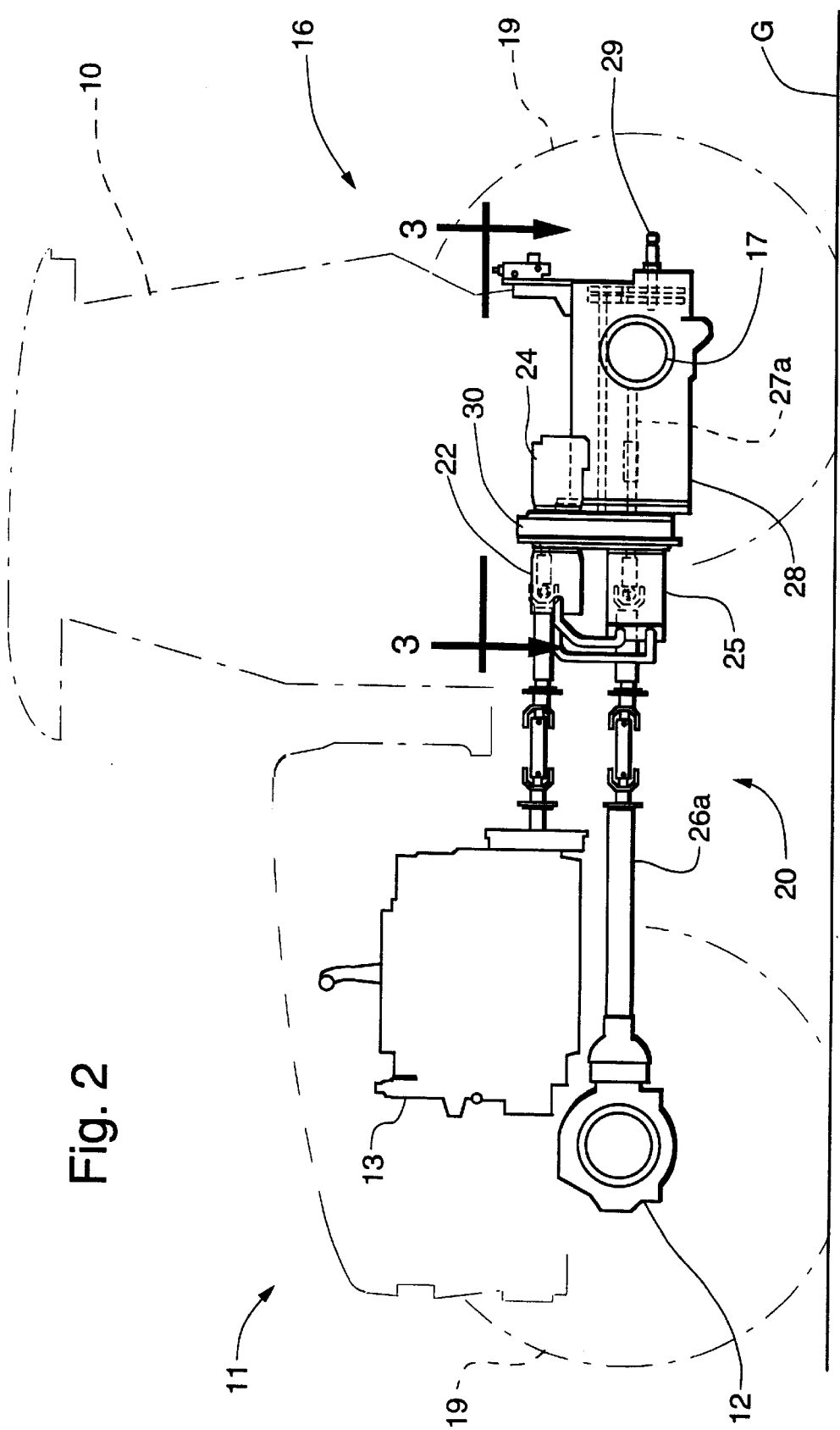
FIG. 2 is a schematic side elevational view of the drive mechanism having a splitter gearbox and associated drives incorporating the principles of the instant invention.
Figure 3:
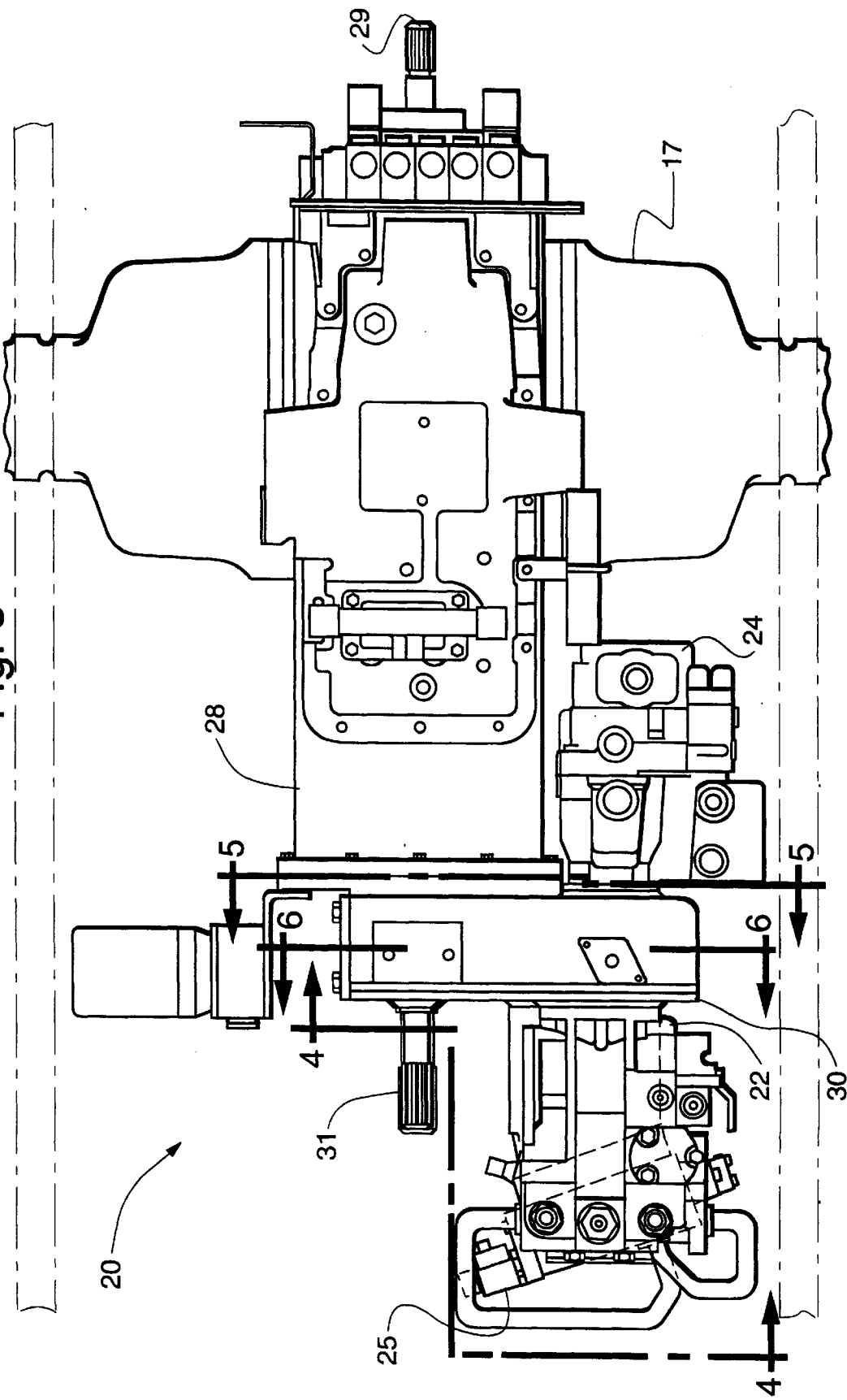
FIG. 3 is a top plan view of the splitter gearbox and rear axle housing corresponding to lines 3—3 of FIG. 2.

As best seen in FIGS. 1 and 2, the front axle assembly 12 is drivingly connected to the front output drive shaft 26 by a front drive shaft assembly 26a. The rear axle assembly 17 is drivingly connected to the rear output drive shaft 27 by a rear drive shaft assembly 27a passing internally through the housing 28 of the rear axle assembly 17. Likewise, the PTO mechanism 29 is drivingly connected to the PTO drive gear 39 and passes through the housing 28 of the rear axle assembly 17 and projects rearwardly therefrom for remote connection to an apparatus (not shown) for delivering rotational power thereto.

Accordingly, the top portion of the splitter gearbox 30 receives rotational power directly from the engine 13 and drives the input drive train components, including the hydrostatic pump 22, the hydraulic pump 24 and the PTO mechanism 29. The lower portion of the splitter gearbox 30 receives operative power from the hydrostatic motor 25 operatively driven from the hydrostatic pump 22 and delivers the rotational power through the output shafts 26, 27 to drive the front and rear axle assemblies 12, 17 from a single hydrostatic motor 25 off of a single gear drive set 35–37.

Figure 8:
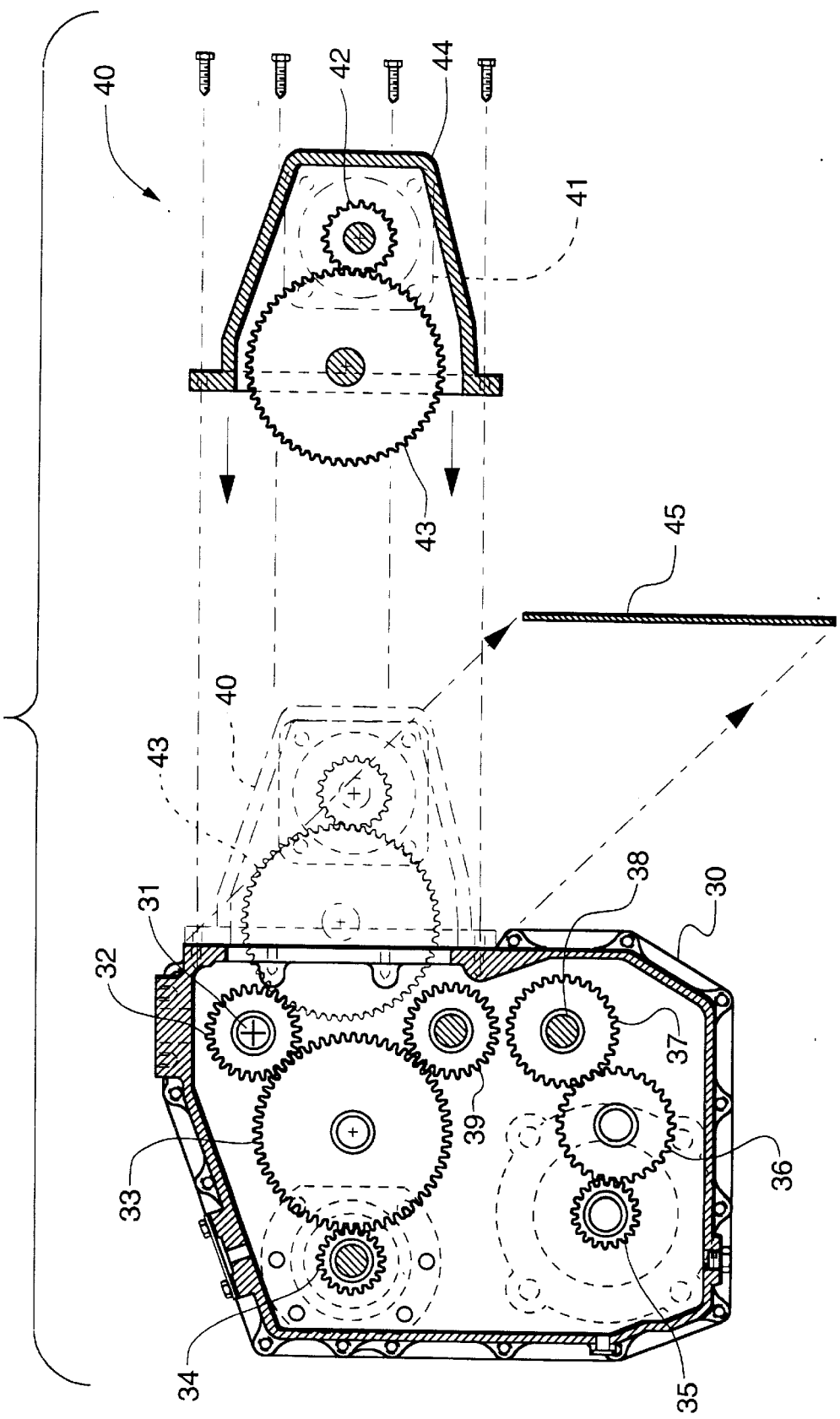
FIG. 8 is a cross-sectional view of the splitter gearbox similar to that of FIG. 6 to depict the addition of an optional auxiliary pump mechanism.
Figure 9:
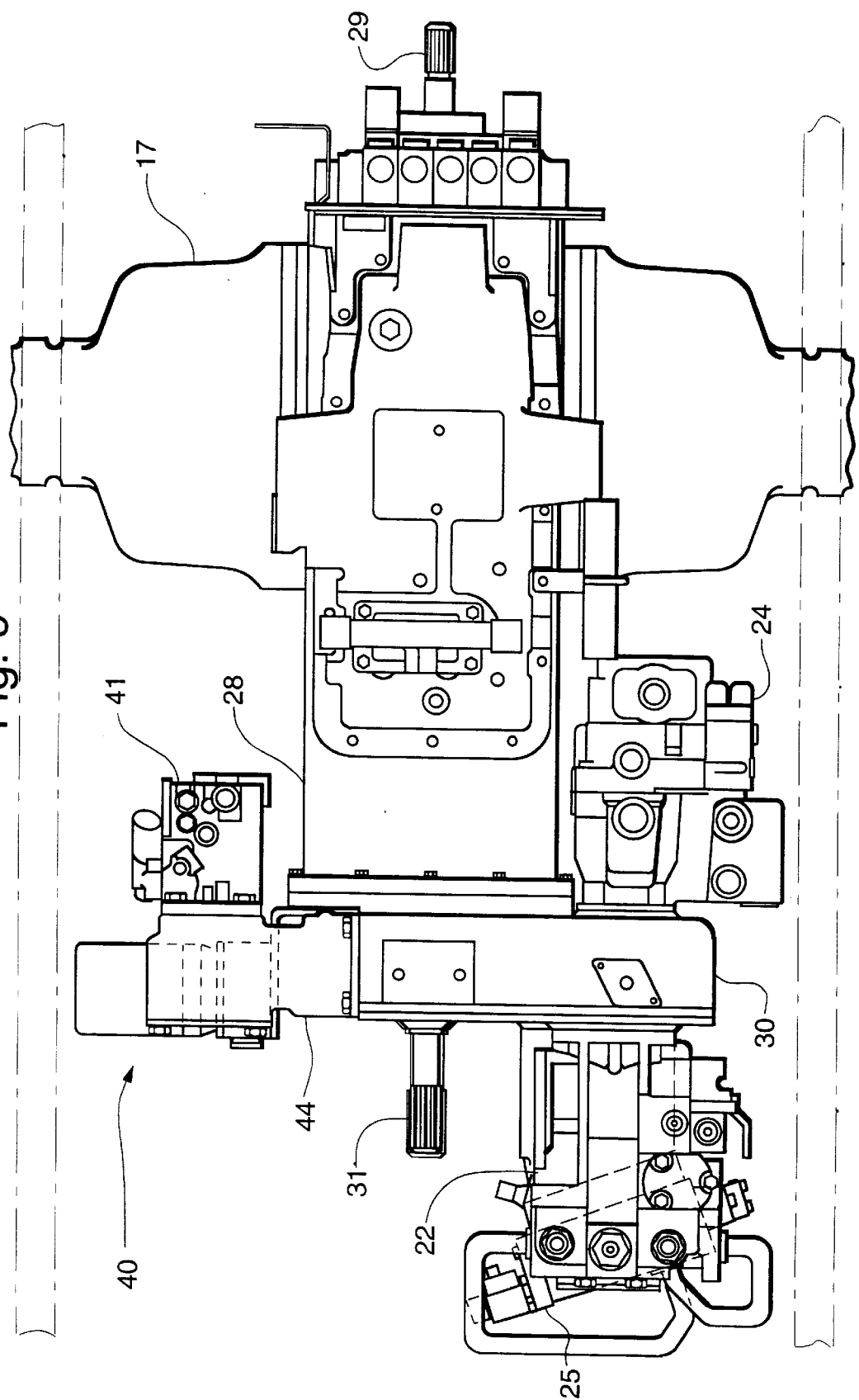
FIG. 9 is a top plan view of the splitter gearbox and rear axle housing similar to that of FIG. 3 but with an optional auxiliary hydraulic pump mounted to the splitter gearbox.

Referring now to FIGS. 8 and 9, the configuration of the splitter gearbox 30 to receive an optional, auxiliary hydraulic assembly 40, which includes an auxiliary pump 41, having a drive pinion 42, and a rotatably mounted third idler gear 43 drivingly engaged with the drive pinion 42. The third idler gear 43 projects outwardly from the housing 44 of the auxiliary hydraulic assembly 40 such that the mounting of the housing 44 to the side of the splitter gearbox 30, as described in greater detail below, will cause the third idler gear 43 to become drivingly engaged with the input gear 32 and, thereby, drive the operation of the auxiliary pump 41, which can then supplement to operation of the primary hydraulic pump 24.

The process for installing the auxiliary hydraulic assembly 40 is best seen in FIG. 8. First the removable side cover 45 of the splitter gearbox 30 is detached from the splitter gearbox 30. The auxiliary hydraulic assembly 40 is then positioned such that the third idler gear 43 extends into the opening in the side of the splitter gearbox 30 formed with the removal of the side cover 45 and becomes engaged with the input gear 32 to receive rotational power directly from the engine 13, as is the primary hydraulic pump 24. The housing 44 is then bolted into place on the side of the splitter gearbox and sealed thereto as a replacement for the side cover 45.

The splitter gearbox configuration described above provides a number of different operational configurations for the operator of this hydrostatically driven tractor 10. By disengaging all other output components, the operator can choose to direct the entire power of the engine 13 to the hydrostatic motor 25 to provide for maximum speed and/or pulling torque of the tractor 10 through one of the pre-set fixed positions of the motor 25. Alternatively, the operator could disengage the hydrostatic motor 25 by placing its swash plate in a neutral position and run the entire power of the engine 13 through the PTO shaft 29, while the tractor 10 remains stationary. Another alternative for the operator, would be to disengage both the hydrostatic motor 25 and the PTO mechanism 29, and run the entire power of the engine 13 through the auxiliary hydraulic system 40. Yet another alternative for the operator would be to disengage all of the hydrostatic motor 25, the PTO mechanism 29, and the auxiliary hydraulic system 40 (if the tractor 10 is so equipped), and divert as much of the power from the engine as possible through the tractor hydraulic system through the hydraulic pump 24; however, since both the hydrostatic pump 22 and the hydraulic pump 24 are run from the same gear 34, less than full engine power can be run through the tractor hydraulics. One skilled in the art will readily recognize that a combination of the above systems will typically be operated, and the operator will have appropriate choices to make for application of the power from the engine 13.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a drive mechanism for a tractor having a chassis supported by a front axle assembly and a rear axle assembly, and an engine for providing operative power for said tractor, and
   a splitter gearbox comprising:
      a housing having a removable cover plate;
      a power input shaft delivering rotational power to said splitter gearbox from said engine;
      a hydrostatic pump mounted on said housing and being operatively connected to said power input shaft to receive rotational power therefrom for powering said front and rear axle assemblies;
      a hydrostatic motor mounted on said housing in flow communication with said hydrostatic pump to receive operative power therefrom;
      an output shaft assembly mounted in said splinter gearbox in mechanical communication with said front and rear axle assemblies to effect a driving connection therewith for the purpose of delivering traction power thereto;
      an input gear set associated with said hydrostatic pump to transfer rotational power from said input shaft to said hydrostatic pump;
   an auxiliary hydraulic pump assembly being selectively mountable on said housing as a replacement for said removable cover plate, said auxiliary hydraulic pump assembly including:
      a housing connectable to said splitter gearbox housing as a replacement for said removable cover plate;
      an auxiliary hydraulic pump supported in said housing and having a drive pinion affixed thereto;
      an idler gear rotatably mounted in said housing for operative engagement with said drive pinion, said idler gear projecting outwardly from said housing for driving engagement with a gear within said splitter gearbox when said housing is connected to said splitter gearbox, said idler gear being rotatably driven by said gear of said splitter gearbox and transferring said rotational movement to said auxiliary hydraulic pump drive pinion for powering the operation of said auxiliary hydraulic pump;
said input gear set including a first drive gear for a PTO mechanism having a PTO shaft that extends out of said splitter gearbox for remote access thereto, said PTO mechanism being selectively engageable independently of said hydrostatic motor such that said tractor can be operated with all of the rotational power from said engine being utilized selectively by said PTO mechanism for operation of a remote device and by said hydrostatic motor for traction of said tractor, said PTO mechanism and said hydrostatic motor both being disengagable to permit substantially all of said rotational power from said engine to be utilized entirely through said auxiliary hydraulic assembly;
   an output gear set associated with said hydrostatic motor to transfer rotational power generated by said hydrostatic motor to said output shaft, said input and output gear sets sharing a common lubrication sump; and
   said auxiliary hydraulic pump assembly being operatively connected to said input gear set to receive operative rotational power therefrom.

2. In a tractor having a chassis supported by a front axle assembly and a rear axle assembly, and an engine for providing operative power, a gearbox having gears rotatably mounted therein and being operatively connected to said engine to receive rotational power from said engine and transfer the rotational power to at least one of said front and rear axle assemblies, and
   an auxiliary hydraulic pump comprising:
      a housing connectable to said gearbox;
      a hydraulic pump supported in said housing and having a drive pinion affixed thereto; and
      an idler gear rotatably mounted in said housing for operative engagement with said drive pinion, said idler gear projecting outwardly from said housing for driving engagement with one of said gears of said gearbox when said housing is connected to said gearbox, said idler gear being rotatably driven by said one gear of said gearbox and transferring said rotational movement to said hydraulic pump drive pinion for powering the operation of said hydraulic pump;

said gearbox is provided with a removable cover plate exposing an opening in said gearbox when removed therefrom, said housing replacing said cover plate when connected to said gearbox;

said gearbox further including:
   a power input shaft delivering rotational power to an input gear set from said engine; hydrostatic pump to transfer rotational power from said input shaft to said hydrostatic pump
   a hydrostatic pump associated with said input gear set and being mounted on said housing to receive rotational power therefrom for powering the front and rear axle assemblies;
   a hydrostatic motor associated with an out put gear set and being mounted on said housing in flow communication with said hydrostatic pump to receive operative power therefrom; and
   an output shaft assembly operatively connected to said output gear set in mechanical communication with said front and rear axle assemblies to effect a driving connection therewith for the purpose of delivering traction power thereto;

said input gear set including a first drive gear for a PTO mechanism having a PTO shaft that extends out of said splitter gearbox for remote access thereto, said PTO mechanism being selectively engageable independently of said hydrostatic motor such that said tractor can be operated with all of the rotational power from said engine being utilized selectively by said PTO mechanism for operation of a remote device and by said hydrostatic motor for traction of said tractor, said PTO mechanism and said hydrostatic motor both being disengagable to permit substantially all of said rotational power from said engine to be utilized entirely through said auxiliary hydraulic assembly.

3. In a tractor having a chassis supported by a front axle assembly and a rear axle assembly, and an engine for providing operative power, and an improved drive mechanism comprising:
   a splitter gearbox mounted to the rear axle assembly to share a common oil sump therewith, said splitter gearbox being operative connected to said engine to receive rotational power therefrom and being operatively connected to said front and rear axle assemblies to deliver rotational power thereto, said gearbox being adapted for the selective mounting of an auxiliary hydraulic pump assembly;

said splitter gearbox including:
   a housing having a removable cover plate, said auxiliary hydraulic pump assembly being connectable to said splitter gearbox housing as a replacement for said removable cover plate;
   a power input shaft delivering rotational power to an input gear set from said engine; hydrostatic pump to transfer rotational power from said input shaft to said hydrostatic pump;
   a hydrostatic pump associated with said input gear set and being mounted on said housing to receive rotational power therefrom for powering the front and rear axle assemblies;
   a hydrostatic motor associated with an output gear set and being mounted on said housing in flow communication with said hydrostatic pump to receive operative power therefrom; and
   an output shaft assembly operatively connected to said output gear set in mechanical communication with said front and rear axle assemblies to effect a driving connection therewith for the purpose of delivering traction power thereto;

said auxiliary hydraulic pump assembly including:
   a housing connectable to said splitter gearbox housing as a replacement for said removable cover plate;
   an auxiliary hydraulic pump supported in said housing and having a drive pinion affixed thereto; and
   an idler near rotatable mounted in said housing for operative engagement with said drive pinion, said idler gear projecting outwardly from said housing for driving engagement with a gear within said splitter gearbox when said housing is connected to said splitter gearbox, said idler gear being rotatably driven by said gear of said splitter gearbox and transferring said rotational movement to said auxiliary hydraulic pump drive pinion for powering the operation of said auxiliary hydraulic pump;

said input gear set including a first drive gear for a PTO mechanism having a PTO shaft that extends out of said splitter gearbox for remote access thereto, said PTO mechanism being selectively engageable independently of said hydrostatic motor such that said tractor can be operated with all of the rotational power from said engine being utilized selectively by said PTO mechanism for operation of a remote device and by said hydrostatic motor for traction of said tractor, said PTO mechanism and said hydrostatic motor both being disengagable to permit substantially all of said rotational power from said engine to be utilized entirely through said auxiliary hydraulic assembly.

* * * * *